US006065879A

United States Patent [19]

Mitsue et al.

[11] Patent Number: 6,065,879

[45] Date of Patent: *May 23, 2000

[54] ROLLING BEARING WITH SEAL

[75] Inventors: Naoki Mitsue; Yuji Nakamura, both of Fujisawa, Japan

[73] Assignee: NSK Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/785,346

[22] Filed: Jan. 17, 1997

[30] Foreign Application Priority Data

Jan. 19, 1996 [JP] Japan .................................... 8-007524

[51] Int. Cl.[7] ...................................................... F16C 33/76

[52] U.S. Cl. .......................... 384/448; 384/486; 277/317; 277/565

[58] Field of Search .................................... 384/486, 485, 384/484, 478, 477, 448; 277/317, 321, 551, 562, 565, 572, 573

[56] References Cited

U.S. PATENT DOCUMENTS

| | | | |
|---|---|---|---|
| 4,376,541 | 3/1983 | Walter et al. | 277/153 |
| 4,792,242 | 12/1988 | Colanzi et al. | 384/482 |
| 4,792,243 | 12/1988 | Takeuchi et al. | 384/486 |
| 4,948,277 | 8/1990 | Alff | 384/477 X |
| 4,958,942 | 9/1990 | Shimizu | 384/486 |
| 5,042,822 | 8/1991 | Dreschmann et al. | 384/486 X |
| 5,261,752 | 11/1993 | Ouchi | 384/448 |
| 5,431,413 | 7/1995 | Hajzler | 384/486 X |
| 5,575,568 | 11/1996 | Rigaux et al. | 384/448 |

FOREIGN PATENT DOCUMENTS

| | | | |
|---|---|---|---|
| 0 378 939 | 7/1990 | European Pat. Off. . | |
| 0 388 258 | 9/1990 | European Pat. Off. . | |
| 0 657 738 | 6/1995 | European Pat. Off. . | |
| 0 785 368 | 7/1997 | European Pat. Off. . | |
| 2 574 501 | 6/1986 | France . | |
| 1178750 | 9/1964 | Germany | 384/486 |
| 42 31 332 | 4/1993 | Germany . | |
| 2 088 971 | 6/1982 | United Kingdom . | |

*Primary Examiner*—Thomas R. Hannon
*Attorney, Agent, or Firm*—Helfgott & Karas, P.C.

[57] ABSTRACT

A rolling bearing with seal has a stationary inner race and rotatable outer race, a first sealing ring faced to the external space and mounted to the inner peripheral end portion of the outer race which rotates during use, so that even if foreign matter in the external space such as muddy water adheres to the outside surface of the first sealing ring, it is slung off by the centrifugal force, while a second sealing ring faced to the balls and mounted to the outer peripheral end portion of the inner race, whereby it is possible to nearly completely prevent the muddy water from penetrating into the space where the rolling elements are located.

2 Claims, 4 Drawing Sheets

1
13
2
16b
16a
15a
7a
6a
16c
6b
7b
9
15b
4
5
14
12

ROLLING BEARING WITH SEAL

FIELD OF THE INVENTION

The present invention is related to a rolling bearing with seal for use in a rotation support section such as the wheel support section of automobiles on which muddy water etc. may be splashed.

DESCRIPTION OF THE RELATED ART

In the case of a rolling bearing which forms the wheel support section of an automobile, it is desired that it be constructed with a high degree of watertightness in order to prevent muddy water, which is splashed on it while driving, from seeping into the bearing. Conventionally, muddy water is prevented from getting inside the rolling bearing by arranging two pairs of sealing rings in the open end portion of the rolling bearing. FIG. 4 shows one example of the construction of a conventional rolling bearing with seal constructed in this manner.

Located between the outer-ring raceway 2 formed around the inner peripheral surface of the outer race or ring 1, and the inner-ring raceway 4 formed around the outer peripheral surface of the shaft 3 which acts as the inner race member, are rolling elements or balls 5 which allow the outer race 1 and shaft 3 to rotate freely with respect to each other. Moreover, a pair of seal rings 8*a*, 8*b* are located between the inner peripheral surface on the end of the outer race 1 and the outer peripheral surface on the end of the shaft 3, and they are located in series in the axial direction of the outer race 1 and shaft 3 (left and right direction in FIG. 4) to make up a seal 9. These seal rings 8*a*, 8*b* are circular shaped and have a circular-shaped reinforcing metal 6*a*, 6*b* which reinforces an elastic member 7*a*, 7*b* made of rubber or elastomer.

Of this pair of sealing rings 8*a*, 8*b*, the elastic member 7*a* of the first sealing ring 8*a*, which is located on the outside in the axial direction (right side in FIG. 4) and faces the outside, has a radially inside edge which is held in place by a mooring groove 10*a* formed around the outer peripheral surface on the end of the aforementioned shaft 3, and a radially outer edge which comes in sliding contact with the inner peripheral surface on the end of the outer race 1.

Moreover, the elastic member 7*b* of the second sealing ring 8*b* is located between the first sealing ring 8*a* and the balls 5 on the inside in the axial direction (left side in FIG. 4) has a radially outer edge which is held in place by a mooring groove 10*b* formed around the inner peripheral surface on the end of the outer race 1. Furthermore, at lease two seal lips 11*a*, 11*b* are formed around this elastic member 7*b*, and the tip edge of the seal lip 11*a* comes in sliding contact with the outer peripheral end face of the shaft 3, and the tip edge of the other seal lip 11*b* comes in sliding contact with the inner side surface of the reinforcing metal 6*a* of the first sealing ring 8*a*.

In the conventional rolling bearing with seal, constructed as described above, the following three places of sliding contact, 1 thru 3, between the external space and the space for accommodation of the balls 5, are located in series with respect to any pathway for muddy water etc:

1) between the outer peripheral edge of the elastic member 7*a* and the inner peripheral surface on the end of the outer race 1.
2) between the tip edge of the sealing lip 11*b* and the inner side surface of the reinforcing metal 6*a*.
3) between the tip edge of the sealing lip 11*a* and the outer peripheral surface on the end of the shaft 3.

Therefore, it is very difficult for anything such as muddy water that exists in the aforementioned external space to reach inside the space where the balls 5 are located.

In the conventional construction shown in FIG. 4, when the shaft 3, which acts as the inner race member, rotates, the sealing ring 8*a* an the outside turns together with the shaft 3, and the sealing ring 8*a* functions as a slinger, and acts as a good seal. That is, as the aforementioned sealing ring 8*a* rotates, the muddy water coming from the external space side and adhering to this sealing ring 8*a* is slung away by the centrifugal force. Therefore, any of the muddy water can hardly penetrate inside the bearing from through the place of sliding contact between the outer peripheral edge of the elastic member 7*a* and the inner peripheral surface on the end of the outer race 1. Moreover, it is almost possible to completely prevent the muddy water from penetrating into the space where the balls 5 are located.

On the other hand, if the bearing is used so that the inner race member such as the shaft 3 is stationary, and the outer race 1 rotates, the muddy water adhering to the outer side surface of the aforementioned first sealing ring 8*a* is not slung off. As a result, there is a possibility that the muddy water adhering to the outer side surface of this sealing ring 8*a* will gradually penetrate inside the bearing through the place of sliding contact between the outer peripheral edge of the elastic member 7*a* and the inner peripheral surface on the end of the outer race 1, and thus the seal is not as effective as when the shaft 3 rotates.

SUMMARY OF THE INVENTION

An object of this invention is to provide a rolling bearing with seal, taking the problem into account, which is constructed so that an adequate seal is obtainable even when the outer race rotates.

Another object of the present invention is to provide a rolling bearing having axially adjacent first and second sealing rings, and the second sealing ring having first and second seal lips, such that the first seal lip has a tip edge coming in sliding contact with the inner peripheral surface of the rotating race member, and that the second seal lip has a tip edge coming in sliding contact with a side surface of the reinforcing metal of the first sealing ring.

DETAILED DESCRIPTION OF THE EMBODIMENTS

Figure 1:
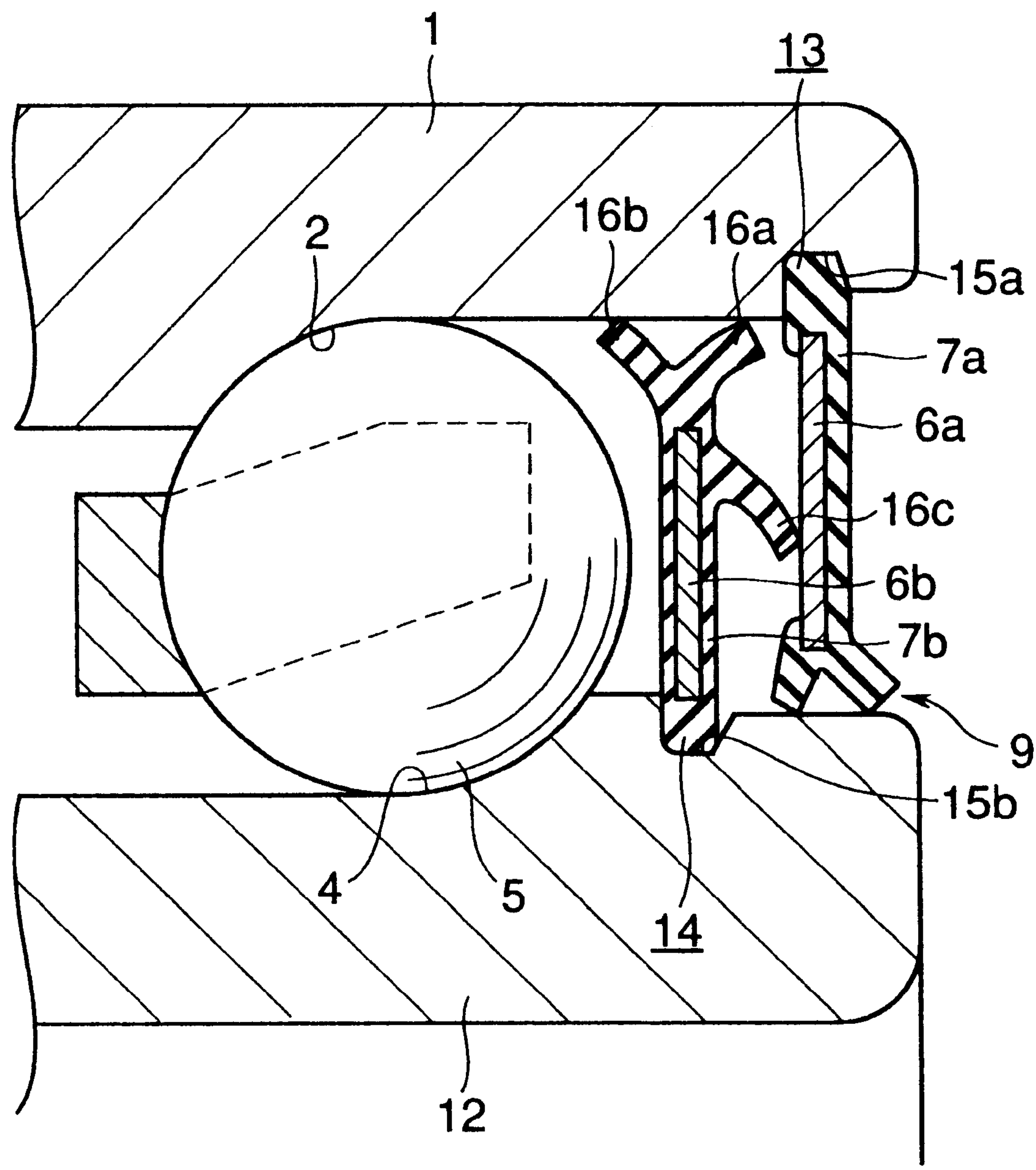
FIG. 1 shows a partial cross-sectional view of a first embodiment of this invention.

The rolling bearing with seal of an embodiment according to this invention comprises a outer race member which has a outer-ring raceway around its inner surface and rotates during use, an inner race member which has an inner-ring raceway around its outer surface and does not rotate during use, a plurality of rolling elements which are located between the aforementioned outer-ring raceway and inner-ring raceway, and first and second sealing rings in a circular ring shape which are comprised of a reinforcing metal in circular shape, and an elastic member which is reinforced by the reinforcing metal, and which are located between the inner peripheral surface of the outer race member and the outer peripheral surface of the inner race member, and are in series in the axial direction of the outer race member and inner race member.

Particularly, in the case of the rolling bearing with seal of this invention, the outer peripheral edge of the first sealing ring, which is located on the outside in the axial direction and which faces the external space, is held in place around the inner peripheral surface of the aforementioned outer race member, and the inner peripheral edge of this first sealing ring comes in sliding contact with the outer peripheral surface of the aforementioned inner race member. Moreover, the inner peripheral edge of the second sealing ring, which is located on the inside in the axial direction and which is located between the first sealing ring and the aforementioned rolling elements, is held in place around the outer peripheral surface of the inner race member, and there are at least two seal lips formed on this second sealing ring of which the tip edge of one of the seal lips comes in sliding contact with the inner peripheral surface of the outer race member, and the tip edge of the other seal lip comes in sliding contact with the inside surface of the reinforcing metal of the first sealing ring.

In the rolling bearing with seal of this invention constructed as described above, there are at least three locations of sliding contact between the external space and the space where the rolling elements are located, as in the conventional construction, in series in the penetration pathway of foreign matter such as muddy water. Accordingly, it is difficult for foreign matter existing in the aforementioned external space to penetrate into the space where the rolling elements are located. Moreover, in the rolling bearing with seal of this invention, the first sealing ring, which is located on the outside in the axial direction and which faces the external space, rotates during use, so even if foreign matter in the external space such as muddy water adheres to the outside surface of the first sealing ring, it is slung off by the centrifugal force. As a result, this foreign matter hardly penetrates to the inside through the point where the inner peripheral edge of this first sealing ring comes in sliding contact with the outer peripheral surface of the inner race member. Furthermore, it is possible to nearly completely prevent the muddy water from penetrating into the space where the rolling elements are located.

Now, embodiments of this invention are described referring to drawings.

FIG. 1 shows a first embodiment of this invention. A plurality of rolling elements or balls 5 are located between the outer-ring raceway 2, which is formed on the inner peripheral surface of the outer race 1 which rotates during use, and the inner-ring raceway 4, which is formed on the outer peripheral surface of the inner race 12 which is stationary during use. For example, in the case of supporting an automobile wheel so that it can turn freely with respect of the suspension, the aforementioned inner race 12 is fitted around and fixed to the stationary axis, and the aforementioned outer race 1 supports the wheel therearound.

A first and second sealing ring 13, 14 are located in series along the axial direction (left and right in FIG. 1) between the inner peripheral surface on the end of the outer race 1 and the outer peripheral surface on the end of the inner race 12. Both of these sealing rings 13, 14 are circular shaped and comprise a circular-shaped reinforcing metal 6*a*, 6*b* and an elastic member 7*a*, 7*b* which is reinforced by the reinforcing metal 6*a*, 6*b*.

Of the first and second sealing ring 13, 14, the first sealing ring 13 is located on the outside in the axial direction (right side in FIG. 1) and faced to the external space. The outer peripheral edge of the elastic member 7*a* of this first sealing ring 13 is held in place by a mooring groove 15*a* formed around the inner peripheral surface on the end of the outer race 1. Moreover, the inner peripheral edge of this elastic member 7*a* comes in sliding contact with the outer peripheral surface on the end of the inner race 12. In the example shown in the figures, the inner peripheral edge of the elastic member 7*a* is forked and this forked section comes in sliding contact with the outer peripheral surface on the end of the inner race 12 at two separate locations in the axial direction.

The second sealing ring 14 is located on the inside in the axial direction (left side in FIG. 1) between the first sealing ring 13 and the balls 5. The radially inner edge of the elastic member 7*b* of the second sealing ring 14 is held in place by a mooring groove 15*b* formed around the outer peripheral surface on the end of the inner ring 12. This elastic member 7*b* of the second sealing ring 14 has three seal lips 16*a* to 16*c*. Of these lips, seal lips 16*a* and 16*b*, which are formed by forking the outer peripheral edge of the elastic member 7*b*, come in sliding contact with the inner peripheral surface of the outer race 1 further on the inside in the axial direction than the aforementioned mooring groove 15*a*, in two separate locations in the axial direction. Moreover, the tip edge of third seal lip 16*c*, which is formed in the center in the radial direction on the outside surface of the elastic member 7*b*, comes in sliding contact with the inside surface of the reinforcing metal 6*a* of the first sealing ring 13.

In the rolling bearing with seal of this invention, which is constructed as described above, there are five locations of sliding contact located in series along the pathway of penetration of foreign matter between the external space where the foreign matter such as muddy water is and the space where the balls 5 are located. Accordingly, the foreign matter in the external space hardly penetrates into the space when the balls are located.

Also, in the rolling bearing with seal of this invention, the first sealing ring 13, which is located on the outside in the axial direction facing the external space, rotates during use, so even if any foreign matter existing in the external space adheres to the outside surface of this first sealing ring 13, it is slung off by the centrifugal force. As a result, the foreign matter hardly penetrates past the point of sliding contact between the inner peripheral edge of the first sealing ring 13 and the outer peripheral surface on the end of the inner race 12. Moreover, it is possible to almost completely prevent muddy water or the like from penetrating into the space where the balls 5 are located.

Figure 2:
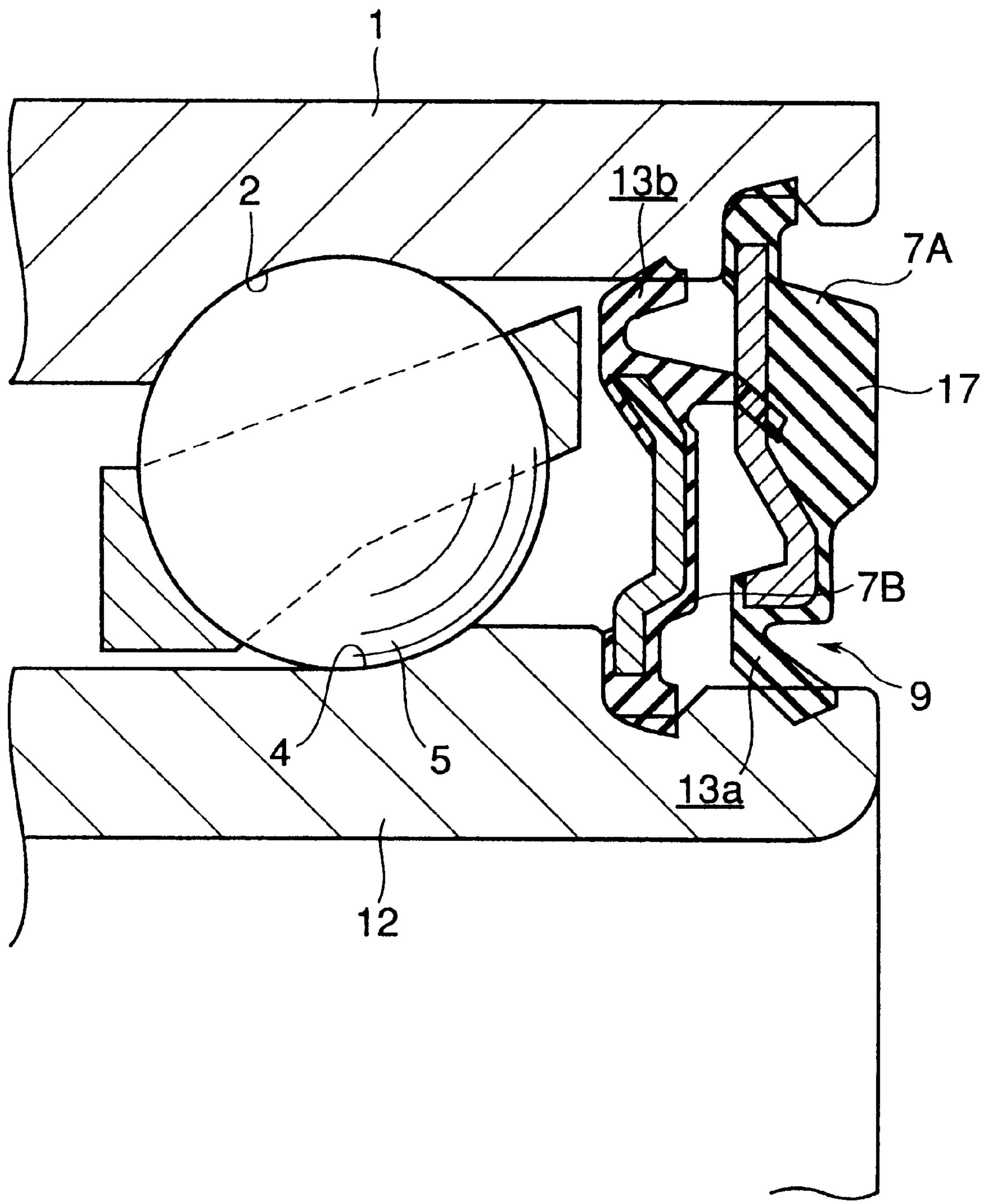
FIG. 2 shows a partial cross-sectional view of a second embodiment of this invention.

FIG. 2 shows a second embodiment of this invention. In this embodiment, the elastic member 7A of the first sealing ring 13*a* is made of magnetic rubber containing ferrite particles or powder. Also, a thick part 17 is formed on part of this elastic member 7A in the center in the radial direction of the first sealing ring 13*a*, and this thick section is magnetized. The magnetic orientation alternates at equal intervals in the circumferential direction. Moreover, S-poles and N-poles are alternately arranged at equal intervals on the outside surface (surface on the right side in FIG. 2) of this thick part 17.

The rolling bearing with seal of this embodiment, constructed as described above, can be used together with a magnetic sensor (not shown in the figures) to construct an rpm detector which can detect the rpm of the outer race 1 and a vehicle wheel supported by it. The other construction and function is basically the same as in the first embodiment described above except for differences in the shape and number of seal lips of the elastic members 7A, 7B of the first and second seal rings 13*a*, 13*b*. The shape of the seal lips formed around the elastic members 7A, 7B shown in FIG. 2 are drawn freely.

Figure 3:
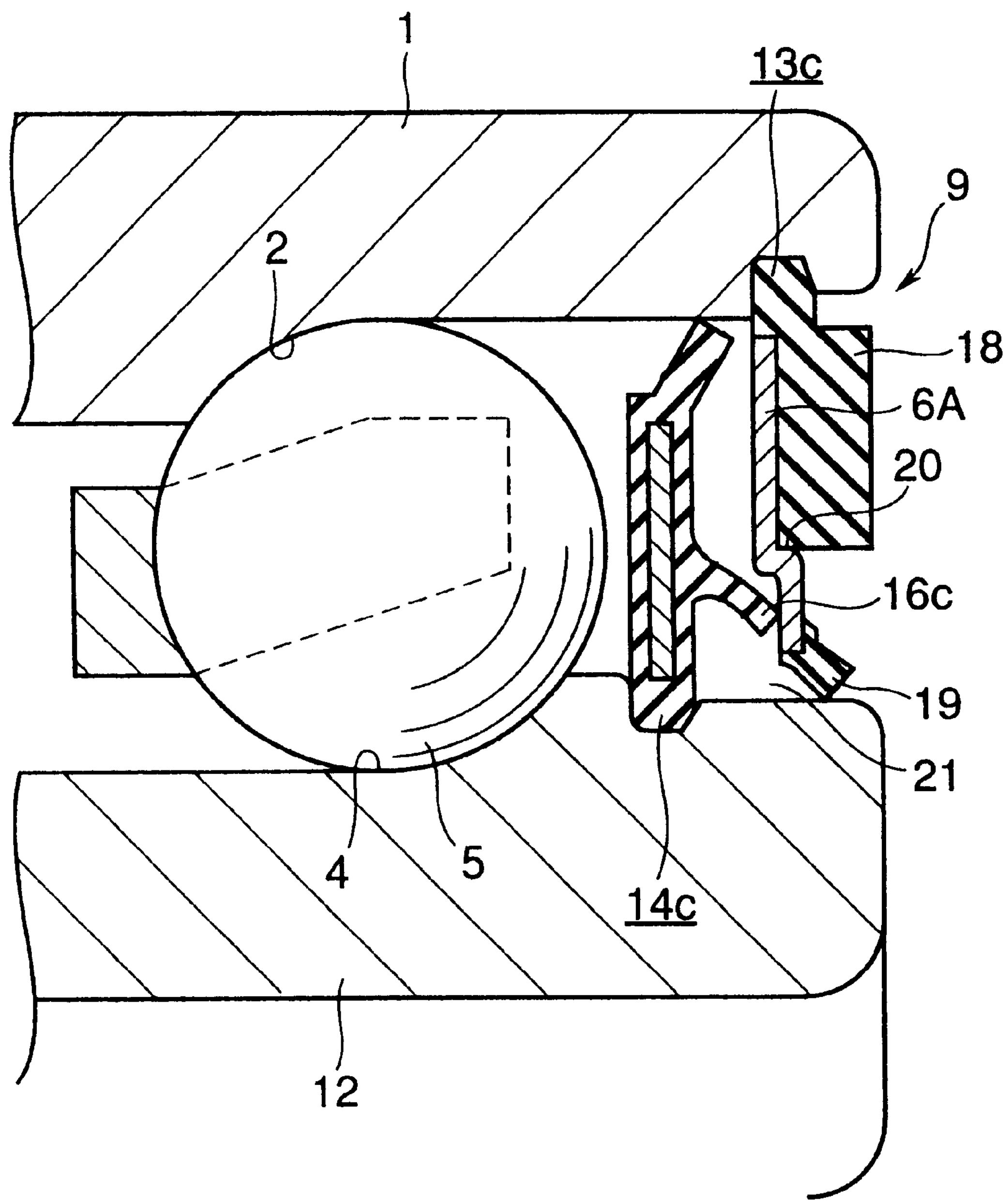
FIG. 3 shows a partial cross-sectional view of a third embodiment of this invention.
Figure 4:
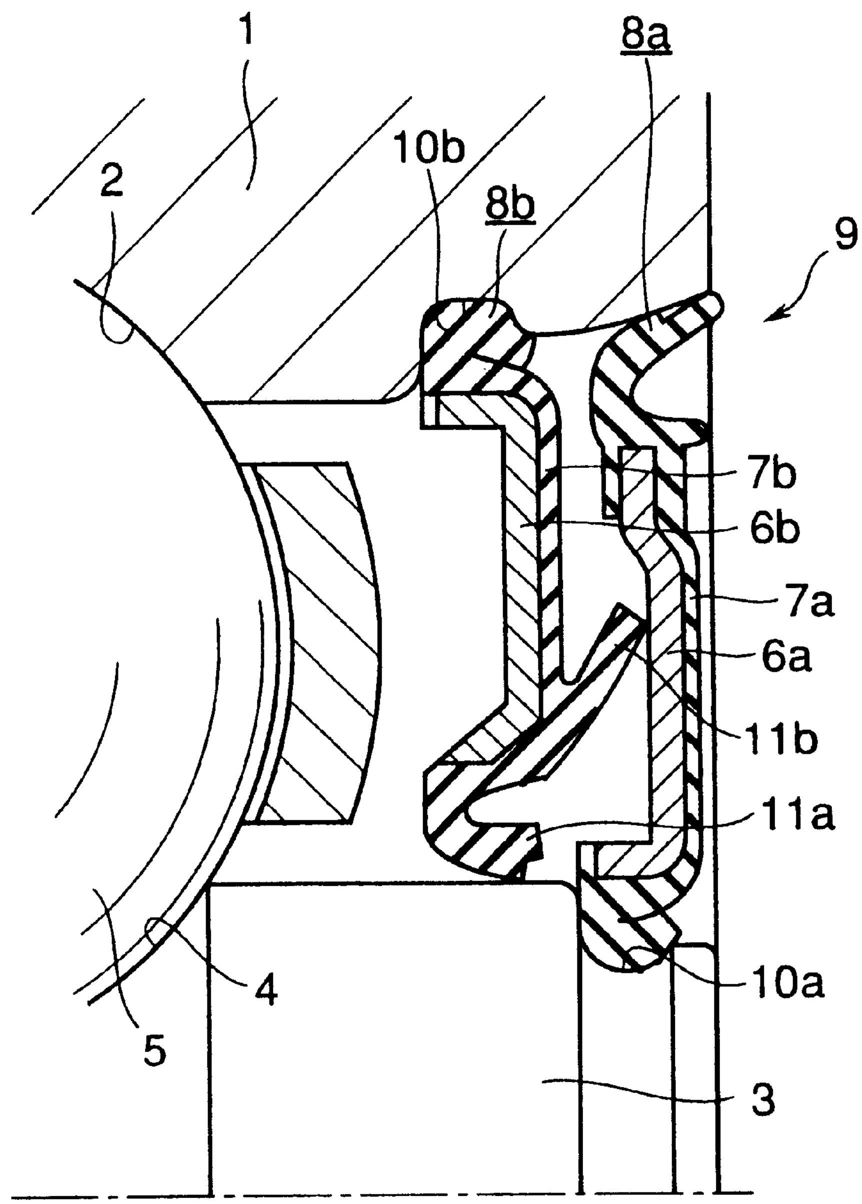
FIG. 4 shows a partial cross-sectional view of an example of prior construction.

Next, FIG. 3 shows a third embodiment of this invention. In this embodiment, a first elastic member 18 made of magnetic rubber is attached to the radially outer half of the reinforcing metal 6A of the first sealing ring 13*c*, and a second elastic member 19 made of ordinary rubber or elastomer is attached to the inner peripheral edge of the reinforcing metal 6A. As in the case of the second embodiment, described above, South poles and North poles are alternately arranged at equal intervals around the outside surface of the first elastic member 18. Also, a crank shaped stepped section 20 is formed in the radially middle portion of the metal core 6A, and is further inward in the radial direction than the first elastic member 18, and the radially inner portion of the reinforcing metal 6A than the stepped section 20 is located on the outside in the axial direction. The tip edge of the seal lip 16*c* on the second sealing ring 14*c* comes in sliding contact with the inside surface of the reinforcing metal 6A further on the inside in the radial direction than the stepped section 20. As shown in FIG. 3, if the first elastic member 18 and the second elastic member 19 are not continuous, and the reinforcing metal 6A is exposed between both of the elastic members 18, 19, it is possible to place part of a metal mold against the exposed portion and perform injection molding with a different material at the same time.

In this embodiment, constructed as described above, the second elastic material 19, which comes in sliding contact with the outer peripheral surface on the end of the inner race 12, is made of ordinary rubber or elastomer that does not contain any ferrite particles, so that it is possible to reduce wear due to friction between the second elastic material 19 and the outer peripheral surface on the end of the inner race 12. Moreover, in the structure with which a bearing is constructed with an rpm detector, it is possible to maintain the durability of the seal formed by sliding contact between the second elastic material 19 and the outer peripheral surface on the end of the inner race 12. Furthermore, by forming the stepped section 20, it is possible to sufficiently maintain the volume of the space 21 that exists between the second elastic member 19 and the seal lip 16*c*. Maintaining the volume of this space 21 contributes to the improvement of the seal by increasing the labyrinth effect.

The rolling bearing with seal of this invention is constructed and functions as described above, and effectively prevents foreign matter, such as muddy water, from penetrating inside the rolling bearing whose outer race rotates during use, and contributes to improved durability of the rolling bearing.

The merit of this invention is to be able to supply high performance seal (a pair of sealing rings) with encoder for use in outer ring rotating application.

What is claimed is:

1. A rolling bearing unit with a speed detecting encoder comprising a rotating outer race member, a stationary inner race member, a plurality of rolling elements provided between the rotating outer race member and stationary inner race member, a seal unit which is provided for sealing an opening portion of the bearing unit and comprised of an outer sealing member fixed to the rotating outer race member and rotating therewith so that a centrifugal force is produced radially toward the outer race member during rotation of said outer sealing member along with said outer race member, said outer sealing member being placed in sliding contact with the stationary inner race member where a small relative circumferential speed at the sliding contact is produced, an inner sealing member located closer to the rolling elements in an axial direction of the rolling bearing unit than said outer sealing member, fixed to the stationary inner race member and placed in sliding contact with the rotating outer race member, and an intermediate seal lip which extends from one of the outer and inner sealing members so as to be in sliding contact with the other seal member, and the speed detecting encoder mounted to the outer sealing member, located on the radially outer side of the sealing portion of the outer sealing member, and made of a magnetic rubber, wherein the centrifugal force produced during said rotation prevents any foreign matter from penetrating a space where said rolling elements are provided.

2. A rolling bearing unit with a speed detecting device comprising a rotating outer race member, a stationary inner race member, a plurality of rolling elements provided between the rotating outer race member and stationary inner race member, a seal unit which is provided for sealing an opening portion of the bearing unit and comprised of an outer sealing member fixed to the rotating outer race member and rotating therewith so that a centrifugal force is produced radially towards said outer race member during rotation of said outer sealing member along with said outer race member, said outer sealing member being placed in sliding contact with the stationary inner race member, an inner sealing member located closer to the rolling elements in an axial direction of the rolling bearing unit than said outer sealing member, fixed to the stationary inner race member and placed in sliding contact with the rotating outer race member, and an intermediate seal lip which extends from one of the outer and inner sealing members so as to be in sliding contact with the other seal member, and the speed detecting device comprising an encoder mounted to the outer sealing member, located on the radially outer side of the sealing portion of the outer sealing member, and made of a magnetic rubber, and a sensor combined with the encoder to detect rotating speed wherein the centrifugal force produced during said rotation prevents any foreign matter from penetrating a space where said rolling elements are provided.

* * * * *